UNITED STATES PATENT OFFICE.

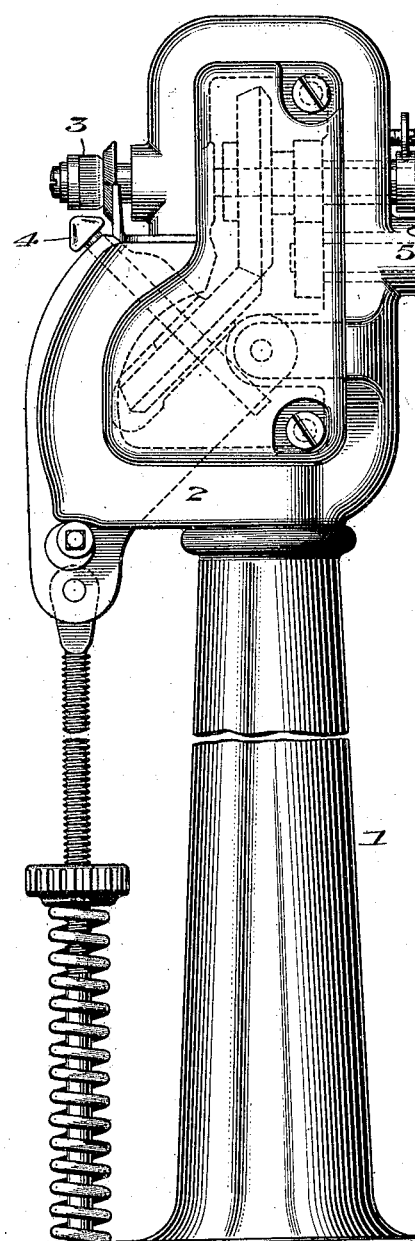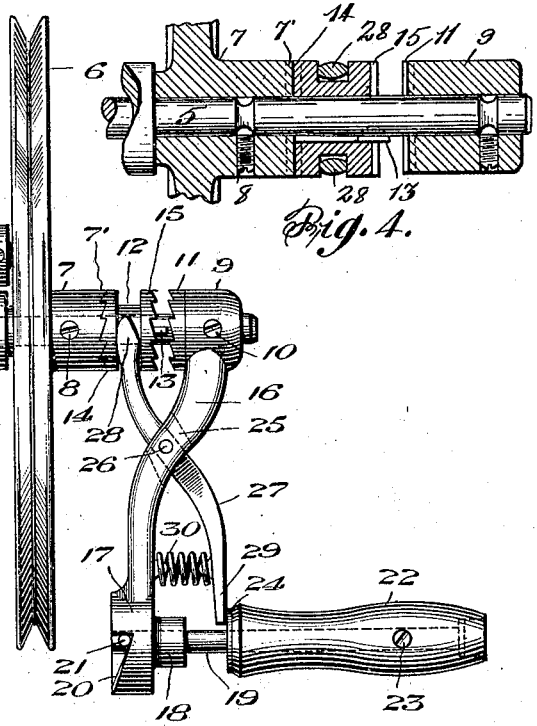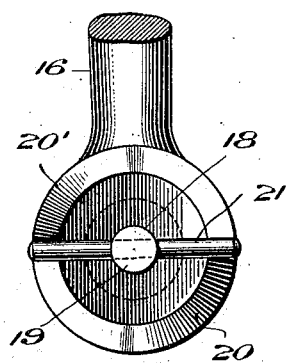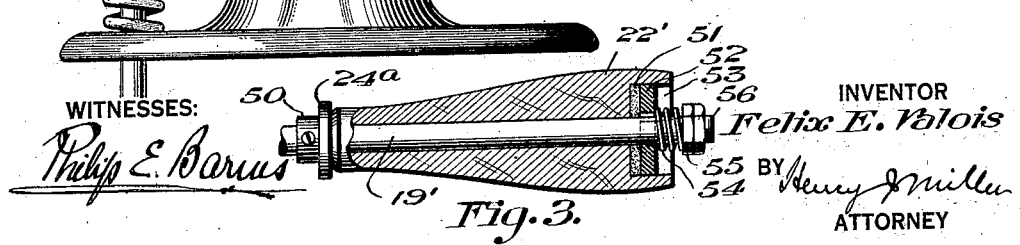

FÉLIX EMILE VALOIS, OF HAVERHILL, MASSACHUSETTS, ASSIGNOR TO HAMEL SHOE MACHINERY COMPANY, A CORPORATION OF MASSACHUSETTS.

DRIVE MECHANISM.

1,399,038.  Specification of Letters Patent.  Patented Dec. 6, 1921.

Application filed December 17, 1918. Serial No. 267,111.

*To all whom it may concern:*

Be it known that I, FÉLIX E. VALOIS, a citizen of the United States, residing at Haverhill, in the county of Essex and State of Massachusetts, have invented certain new and useful Improvements in Drive Mechanisms, of which the following is a specification, reference being had therein to the accompanying drawings.

This invention relates to devices for controlling the operation of combined power and hand driven mechanism, and more particularly to such devices wherein a manually operated handle is utilized as the primary controlling element. In certain types of machine, wherein a power drive is employed, it is found desirable during certain portions of the operation performed to disconnect the power drive and to slowly actuate the machine parts by hand, and when said portions of the operation are completed, to again render effective the more rapid power drive. Such machines commonly employ a drive pulley or its equivalent, mounted upon the driven shaft and a hand operable crank member also mounted upon the shaft together with suitable means permitting said pulley and crank to be alternatively coupled to said shaft for driving the same.

The present invention provides a simple and dependable automatically acting mechanism whereby the power drive may be rendered ineffective and the hand drive simultaneously effective upon the operative manipulation of the latter by the operator.

The invention further consists in the employment in a drive mechanism in which power and hand operated drive elements may be alternatively clutched to a driven shaft, of a crank having a hand grip arranged to be frictionally grasped by the operator and when so grasped automatically to cause the hand drive element to be clutched to the shaft upon turning of the crank.

The invention provides, in connection with a power driven element and a hand driven element having clutch means for alternatively clutching said elements to a driven shaft, a crank arm fast to said hand driven element and provided with a rotatable and slidable hand grip together with a cam for causing said grip to automatically slide relatively to said crank arm when the operator grasps said grip and thereby turns the crank, such sliding movement acting through suitable connections for unclutching the power driven element and clutching the hand driven element to the driven shaft.

Other objects of the invention together with advantageous arrangements of parts and desirable details of construction will appear from the following specification and are more particularly pointed out in the appended claims, reference being had to the accompanying drawings in which:—

Figure 1 is a front elevation of the device forming the subject matter of this invention, the same being illustrated as applied to a shoe sole molding machine, and Fig. 2 is a detail side elevation of a cam employed in the device.

Fig. 3 is a cross sectional detail of a modified form of hand grip.

Fig. 4 is a fragmentary longitudinal section along the drive shaft of the machine.

The invention is herein disclosed as applied to a shoe sole molding machine of ordinary construction, it being understood, however, that this invention is not restricted to such use but may be employed in connection with any machine or mechanism in which it is desired that a hand-operated driving crank be alternatively clutched and unclutched to and from a driven element.

In the drawings the numeral 1 indicates the base or column of a machine of the type above indicated, carrying upon its upper extremity a head or frame 2 furnishing a support for the sole edge molding rolls 3 and 4, and also providing bearings for a drive shaft 5, by means of which said rolls are actuated. 6 is a power drive pulley mounted for free rotation upon the shaft 5, and provided with a boss or hub 7, a screw or pin 8 passing through said boss and into a groove in the shaft and serving to prevent longitudinal movement of the pulley with respect to the latter. The outer extremity of the hub 7 is provided with a clutch element 7', the purpose of which will be hereinafter described.

Spaced from the pulley 6 and upon the shaft 5, is rotatably mounted a collar 9 which is prevented from longitudinal movement on the shaft by means of a pin or screw 10 engaging within a groove in the shaft, said collar being further provided with a clutch element 11. 12 is a sleeve mounted upon the shaft 5 between the hub 7 and the sleeve 9 and provided with a central external groove, said sleeve being keyed to the shaft as by means of a key 13, whereby it is permitted to have longitudinal movement thereon but is prevented from rotation with respect thereto. The sleeve 12 is provided with clutch elements 14, 15 complemental to the respective elements 7' and 11, and is thus adapted to transmit motion to the shaft from either the drive pulley 6 or the collar 9.

The collar 9 has projecting from one side thereof a crank arm 16 which may be integral with the collar or fixed thereto in any desired manner, said crank arm 16 having at its free extremity an enlargement or boss 17. The boss 17 is provided with a journal opening 18, within which is mounted for rotation and for sliding movement, a crank pin 19. The left hand surface of the boss 17 (as seen in Fig. 1) constitutes a cam member, comprising inclined surfaces 20, 20', it being noted, however, that under certain circumstances a single one of such inclines may be sufficient. Coöperating with the cam inclines 20, 20' is a bar 21 extending transversely through the left hand extremity of pin 19 (as seen in Fig. 1) and being fixed therein, the opposite ends of said bar resting against the respective surfaces 20, 20'.

22 is a hand grip of ordinary form fixed to the crank pin 19 by means of a screw 23 or equivalent device, and having its inner end surface 24 normally spaced from the adjacent surface of the boss 17. The crank arm 16 is slotted centrally as at 25 and has pivoted within said slot by means of a pin 26, a lever member 27. One extremity 28 of said lever lies within the groove of the sleeve 12, while the opposite extremity engages against the end surface 24 of the grip member 22. 30 is a spring interposed between the lever 27 and the crank arm 16, this spring serving normally to throw the clutch sleeve 12 to the left (as seen in Fig. 1) and at the same time to retain the bar 21 in engagement with the cam surfaces 20, 20'.

The operation of the above device is as follows: In the use of the machine, shaft 5 is normally clutched to the pulley 6, and the latter is continuously driven by means of a belt whereby the molding rolls are rotated at a uniform high speed. In machines of the above character, it is at times desirable to drive the molding rolls at a much less speed than that imparted by the drive shaft. The operator accordingly employs his left hand to manipulate the work as it passes between the rolls 3 and 4 and holds the hand crank in his right hand. Upon reaching that portion of the work at which it is desired to cause a slow rotation of the rolls, the operator grasps the grip 22 and thereby rotates the crank arm 16. As the crank arm rotates, the frictional engagement of the operator's hand with the grip 22 causes the latter, with the crank pin 19, to rotate within the bearing 18, such rotation of the crank pin 19 causing the pin 21 to ride up along the cam surfaces 20, 20', thus producing a longitudinal motion of the pin 19 within its bearing 18. Such movement of the pin 19 causes the surface 24 of grip 22, which is in engagement with the extremity 29 of lever 27, to push against such extremity, thereby compressing the spring 30 and at the same time disengaging the clutch elements 7', 14 and immediately thereafter engaging clutch elements 15, 11. The operator now continues to operate the crank arm 16 permitting the grip 22 to slip under his hand, but still maintaining a considerable amount of friction thereon. As the crank arm 16 is thus rotated the rolls 3, 4 are turned at such speed as the operator desires. Upon reaching that portion of the work at which a higher speed is desired, the operator merely releases his grip upon the member 22, whereupon the spring 30 causes the bar 21 to ride down the cam surfaces 20, 20', disengaging the clutch elements 15, 11 and immediately thereafter reëngaging clutch elements 14, 7', whereupon the machine is again driven, through pulley 6.

In certain cases it may be found desirable to employ a hand grip of a type which the operator may grasp firmly during the entire operation, one form of such grip being shown in Fig. 3, in which 19' is the crank pin and 22' is the grip mounted thereon, this hand grip being free to rotate on the pin 19'. 50 is a collar fixed to the crank pin as by means of a set screw and having a flange forming an abutment for the inner end of the grip 22', said flange having a surface 24ª for engagement by the end of lever 27. The outer end of the grip 22' is formed with a concentric chamber 53, within which is mounted a washer 51 of felt or other suitable friction material, which encircles the pin 19' and bears against the inner wall of said chamber. 52 is a washer keyed to the pin 19' for rotation therewith, and resting against the surface of the felt washer 51, but resiliently tensioned against the washer by means of a coiled spring 54 surrounding the pin 19', said spring being held in adjusted position by means of a suitable nut 55 having threaded engagement with the end 56 of the pin 19'.

With this construction the end 29 of the lever 27 rests against the face 24ª of the flange of the part 50. The operator grasps the grip firmly in his hand, thereby rotating the crank arm 16, and due to the friction between the grip 22' and the washer 52, acting through the washer 51, the washer 52 will be rotated with the hand grip, imparting to the pin 19' sufficient rotation to cause said pin to move lengthwise within its bearing 18. This movement, through lever 27, causes the crank arm 16 to be clutched to the shaft 5, and during the continued rotation of the crank arm 16, the operator maintains his grasp on the grip 22', sufficient slippage occurring at this time between the washers 51, 52 and the grip 22' to permit the latter to turn upon the pin 19'. By this arrangement the necessity of permitting the grip to slip within the hand of operator during the rotation of the crank arm is obviated.

While the above mechanism as described is a preferred embodiment of the invention, it is to be understood that the same is not to be limited to this specific form, but is intended to include all such modifications and changes therein as may fall within the scope of the appended claims.

Having thus described the invention and its mode of operation what I claim is:

1. In a device of the class described, in combination, a part to be driven, a freely rotatable crank arm for driving the same and provided with a clutch element, a complemental clutch element slidably keyed to the part to be driven by said crank arm, a crank pin carried by said arm and slidable thereon, and means for transmitting sliding movement of said crank pin to said slidable clutch element for actuating the latter.

2. In a drive mechanism, in combination, a driven shaft, a crank arm freely rotatable thereon, clutch means for coupling said crank arm to the shaft, a crank pin slidable in said arm, a hand grip fixed to said pin, and a lever device interposed between said grip and said clutch means, whereby sliding movement of said grip and pin serves to actuate the clutch means.

3. In a device of the class described, in combination, a driven shaft, a crank arm freely rotatable thereon, means for clutching said arm to the shaft, a crank pin slidably and rotatably mounted in said arm, means for imparting a sliding movement to said pin upon rotation of the same relatively to the crank arm, and means for transmitting said sliding movement to the clutching means for actuating the latter.

4. In a drive mechanism, in combination, a driven shaft, a crank arm normally out of driving engagement with said shaft, clutch means for coupling said crank arm to the shaft, a crank pin slidably and rotatably mounted in said arm, cam means for imparting a sliding movement to said pin upon rotation of the latter relatively to the arm, and a lever member for transmitting said sliding movement to the clutch means.

5. In a mechanism of the class described, in combination, a driven shaft, a crank arm loosely mounted thereon and provided with a clutch element, a complemental clutch element slidably keyed to the shaft, a crank pin slidably and rotatably mounted in said arm, connections between said pin and said slidable clutch element, a cam member carried by said arm, and a cam follower fixed to said pin and engaging the cam.

6. In a combined power and hand drive mechanism, in combination, a driven shaft, a drive pulley freely rotatable thereon, a crank arm loosely mounted upon said shaft, a clutch member slidably keyed upon said shaft and arranged for alternatively coupling said pulley and arm to the shaft, a crank pin slidably and rotatably mounted in said crank arm, a cam member fixed to said arm and concentric with said pin, a transverse bar fixed in said crank pin and arranged to engage said cam member, a lever pivoted to said crank arm and having one end thereof engaging said clutch member and the other end operatively engaging said crank pin, and spring means normally acting to retain said clutch member in driving engagement with said pulley.

7. In a drive mechanism, a normally operative power drive, a hand drive comprising a manually operable crank handle, and means constructed and arranged whereby upon operative rotational movement of said handle said power drive is automatically rendered ineffective.

8. In a drive mechanism, a power drive, a shaft normally coupled thereto, a manual drive comprising a crank arm normally loose on said shaft and provided with a crank handle rotatable relative thereto and means operative on rotation of said handle to uncouple said power drive from and couple said hand drive to said shaft.

9. In a drive mechanism, a power drive, a shaft normally coupled thereto, a hand drive normally uncoupled from said shaft, said hand drive comprising a rotatable element, and means for uncoupling said power drive from and coupling said hand drive to said shaft on rotation of said element.

10. In a drive mechanism, two drives, a shaft arranged to be selectively coupled to said drives, and a rotary element on one of said drives arranged by its rotation to uncouple one of said drives from and couple the other of said drives to said shaft.

In testimony whereof I have signed my name to this specification.

FÉLIX EMILE VALOIS.